United States Patent [19]
Rubin

[11] Patent Number: 5,865,147
[45] Date of Patent: Feb. 2, 1999

[54] ANIMAL EXERCISE TOY CONTAINING ANIMAL MEAL

[76] Inventor: Ellice L. Rubin, P.O. Box 1142, Agoura Hills, Calif. 91376

[21] Appl. No.: 826,397

[22] Filed: Mar. 25, 1997

[51] Int. Cl.[6] .................................................. A01K 29/00
[52] U.S. Cl. .................................................. 119/711
[58] Field of Search .................... 119/708, 709, 119/710, 711

[56] References Cited

U.S. PATENT DOCUMENTS

| | | | |
|---|---|---|---|
| 1,006,182 | 10/1911 | Cousin | 119/711 |
| 1,022,112 | 4/1912 | Smith | 119/711 |
| 2,086,631 | 7/1937 | Munro | 119/711 |
| 5,191,856 | 3/1993 | Gordon | 119/29.5 |
| 5,339,771 | 8/1994 | Axelrod | 119/710 |
| 5,351,652 | 10/1994 | Budman et al. | 119/711 |
| 5,390,629 | 2/1995 | Simone | 119/711 |

*Primary Examiner*—Jack W. Lavinder
*Assistant Examiner*—Yvonne R. Abbott

[57] ABSTRACT

An animal exercise toy made of a durable molded material consisting of a receiving container 10, a removable top 12, with food escape holes 14 creating a positive aromatic and taste attraction when a meal is placed in the food chamber 20, thus encouraging enthusiastic animal interaction.

1 Claim, 2 Drawing Sheets

ANIMAL EXERCISE TOY CONTAINING ANIMAL MEAL

BACKGROUND

1. Field of Invention

This invention relates to animal toys, specifically to toys that dispense food treats to encourage exercise and reduce boredom.

2. Description of Prior Art

Several animal toys have been developed attempting to solve the problem of animal boredom and the misbehavior that is associated with it.

U.S. Pat. No. 5,339,771 to Axelrod (1994) is an animal toy containing a meal. The toy requires that the animal chew up the toy to release the food contents within, thereby destroying the toy.

Most recreational and amusement toys for horses do not contain edible treats, thereby limiting the horse's interest and participation. U.S. Pat. No. 5,351,652 to Budman (1994) for example, is a resilient body impregnated or treated with an aromatic product. The horse does not actually eat food, thereby limiting this toy's effectiveness in encouraging activity.

U.S. Pat. No. 5,191,856 to Gordon (1993) attempts to relieve animal boredom by using aromatic substances deposited within a tube shaped toy. The substance within the tube is contained by bell shaped end-pieces retained by a spring attached between them. Although this model may be sufficient for cats, this design may compromise the durability required by animals such as horses and dogs. This inventor suggests placing catnip or other aromatic substances inside the tube, having particles large enough to prevent escape from the pores in the tube wall.

Similarly, U.S. Pat. No. 5,390,629 to Simone (1995) is a transparent tube containing a toy mouse filled with a fragrant substance such as catnip. This design does not allow for changing toys or substances within the container, so the animal may lose interest.

OBJECTS AND ADVANTAGES

Several objects and advantages of my animal toy are as follows:

(a) to provide a toy which attracts animal interest by an aromatic method;

(b) to provide a toy which attracts animal interest by delivering a meal or treat in response to play;

(c) to provide a toy which delivers food substances at a slow rate, reducing gorging and leading to additional hours of entertainment;

(d) to provide an animal toy which is reusable;

(e) to provide a toy which allows mixing vitamins or medication within the added meal as recommended by a veterinarian;

(f) to provide a toy with variable set-up configurations to accommodate differing animal interests or living quarters;

(g) to provide an animal toy which is durable;

(h) to provide a toy which elicits immediate attention to problem-solving in contrast to slow-to-learn or limited interest toys.

DRAWING FIGURES

In the drawings, closely related figures have the same number but different alphabetic suffixes.

Figure 2:
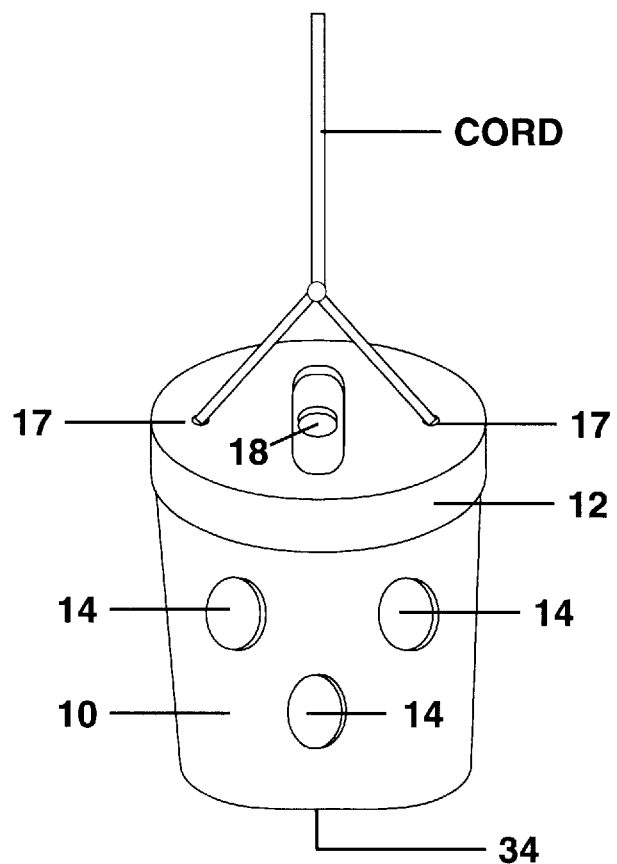

FIG. 2 demonstrates how a cord can be passed through holes in the top if the toy is to be hung.

Figure 3:
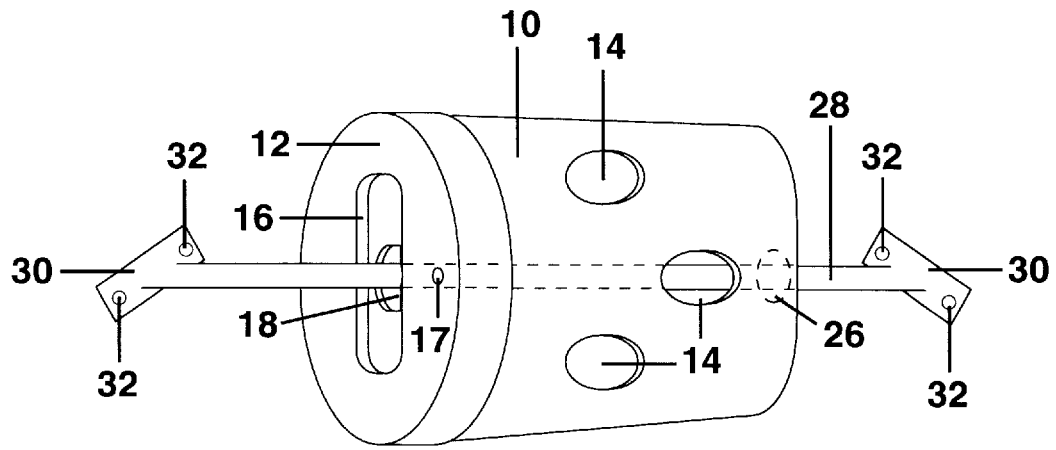

FIG. 3 illustrates the toy with a mounting bracket for securing in a corner of an animal's shelter.

REFERENCE NUMBERS IN DRAWINGS 10 receiving container
12 removable top
14 escape holes
16 grip slot
17 hole
18 center hole
20 food chamber
22 receiving container threads
24 interior threads of top
26 base hole
28 mounting bracket
30 mounting bracket end-pieces
32 screw holes
34 base

DESCRIPTION—FIGS. 1–3

Figure 1A:
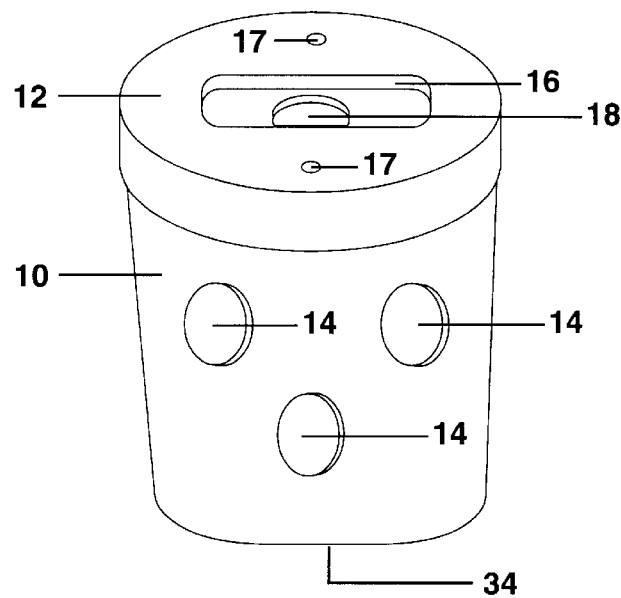
FIG. 1A illustrates the animal toy with its top closed.
Figure 1B:
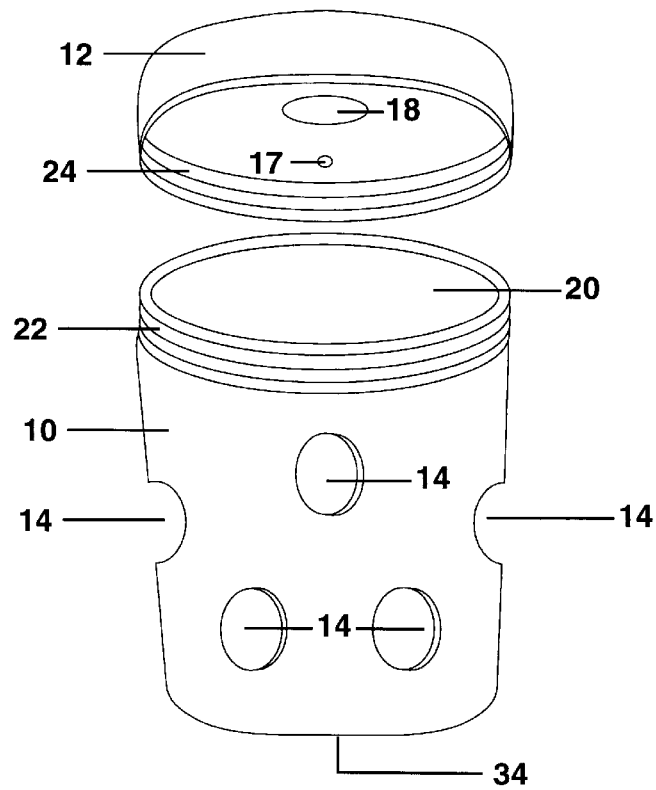
FIG. 1B shows the interior of the toy, the food chamber, in which the animal meal or treat is placed, and the toy's removable top in greater detail.

FIGS. 1A and 1B show the basic properties of this animal toy. FIG. 1B is an exploded view of the toy illustrating the food chamber interior and the properties of the toy's removable top in greater detail. FIGS. 2 and 3 illustrate alternate methods for using the toy in situations where the animal's living quarters are confining.

The exterior of the animal toy is illustrated in FIG. 1A. A receiving container 10 has several escape holes 14 through which the contents of a food chamber 20, FIG. 1B can escape. A removable top 12 screws onto and over a receiving container 10, as illustrated in FIG. 1B. Removable top 12 has interior threads 24 FIG. 1B which screw snugly onto exterior threads 22 of receiving container 10.

Removable top 12 has holes 17, on either side of a grip slot 16, where a cord can be attached for hanging purposes as shown in FIG. 2. Additionally, a center hole 18 in removable top 12, and a base hole 26 in base 34, receives a mounting bracket 28 for installation in the corner of an animal's enclosure. Mounting bracket end-pieces 30 with screw holes 32 are angled forty-five degrees to the long-axis of mounting bracket 28 to allow securing to any corner where walls meet at a typical ninety-degree angle. Mounting bracket 28 passes through center 18 and base hole 26. Mounting bracket 28 must be of sufficient length to allow removable top 12 to be separated from receiving container 10 for reloading food chamber 20.

The correct size for the toy will be adjusted for the type of animal. The toy will be made large enough so that the animal cannot pick it up by mouth. The toy will be made of a durable and rigid substance for safety and longevity. The toy will have no sharp edges. For esthetic purposes, the toy can be produced in a variety of pleasing colors. The toy shown here has a wide cylindrical body, but other shapes could be constructed and serve the same purpose.

From the description above, a number of advantages of my animal toy are evident:

(a) The toy is refillable, and therefore can be used repeatedly.

(b) Food or treats can be changed to encourage new interest and enthusiasm in play with the toy.

(c) By inserting a cord through small holes provided in the removable top, the toy can be hung.

(d) By use of a mounting bracket, the toy can be secured to a wall allowing the toy to be spun to dispense food.

(e) The grip slot minimizes damage to the toy if this toy is to be given to animals that chew.

(f) By varying the dimensions and overall size of the toy during manufacture, it can be made suitable for animals of any size.

(g) Providing this toy may significantly reduce boredom in confined animals. Health and behavior problems easily develop in bored animals. A few examples are; feather picking in birds leading to skin sores, cribbing in horses which can result in dental and digestive problems, repetitive licking in dogs leading to development of lesions called lick granulomas, and destructive social problems created by bored zoo animals. Many more disorders related to animal boredom and inactivity are documented. These behavior disorders could all be minimized through interaction with this toy.

OPERATION—FIGS. 1–3

The manner in which animals operate this toy is as follows: When configured as a "free" toy or placed in a large diameter feed tub, the animal may roll the toy back and forth. With each turn, small amounts of the animal meal will be released through the escape holes of the container, encouraging the animal to continue moving the toy about until all of the meal is released and consumed.

Additionally, FIG. 2 illustrates attaching a cord through holes in the removable top, thereby allowing the toy to be hung. When the animal swings the toy, small amounts of food fall onto the floor or into a feed tub placed below the toy where it may be consumed. This method is excellent for animals confined to small living quarters.

Similarly, FIG. 3 illustrates the use of one possible type of bracket to mount the toy in a corner of the animals living space. As the animal manipulates the toy with his nose, lips, or tongue, the food is released onto the floor or into a feed tub placed under the toy.

The animal toy can easily be refilled by grasping the grip slot of the removable top in one hand and the base in another. With a twisting motion, the top can be unscrewed from the receiving container. A suitable food can then be replaced into the container up to the level of its opening. The top is then replaced snugly and the toy is ready for additional hours of play.

SUMMARY, RAMIFICATIONS, AND SCOPE

Accordingly, the reader will see that this animal toy can be enjoyed by a wide range of animals including; horses, dogs, cats, birds, rodents and a variety of zoo animals. Furthermore, this animal toy has additional advantages in that it encourages immediate interest when food is placed inside;

it can be manufactured in a variety of sizes and food escape hole dimensions making it a species specific toy;

it can be recommended by veterinarians for the dispersal of vitamins or medication within the animal meal;

it provides a method for slowing the consumption rate of food;

it encourages exercise in animals kept in confinement;

this animal toy can be hung, rolled on the ground, or installed onto a wall or fence, thereby providing a variety of play methods;

made out of a durable material, this toy is reusable;

most importantly, this toy addresses boredom in confined animals, which may reduce behavioral and serious health problems.

The description above should not be construed as limiting the scope of the invention, but as merely providing illustrations of some of the presently preferred embodiments of this animal toy. For example, this animal toy could be produced to take on a spherical, oval, cuboidal shape, etc. The grip slot of the removable top could likewise take on various shapes serving the same purpose.

Thus the scope of this animal toy should be determined by appended claims and their legal equivalents, rather than by the examples given.

What is claimed is:

1. An animal exercise toy comprising:
    a) a shaped container having a closed bottom end and an open top end;
    b) food for an animal contained in said container:
    c) said open top end of said container having a threaded portion;
    d) a removable top having a center hole and at least two holes of a size different than said center hole, and a threaded portion which matingly receives said threaded portion of said open top end; and
    e) wherein said container and removable top are both formed of a durable molded material, with a plurality of food escape holes spaced around said container.

* * * * *